US012275209B2

(12) United States Patent
Kim et al.

(10) Patent No.: US 12,275,209 B2
(45) Date of Patent: Apr. 15, 2025

(54) TIRE SOUND ABSORBING MATERIAL CRIMPING DEVICE

(71) Applicant: KUMHO TIRE CO., INC., Gwangju (KR)

(72) Inventors: Woon Yeong Kim, Gwangju (KR); Byungjae Go, Gwangju (KR); Kyungho Moon, Gwangju (KR); Jeong Won Yang, Gwangju (KR); Kyung Hak Cho, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 150 days.

(21) Appl. No.: 18/172,639

(22) Filed: Feb. 22, 2023

(65) Prior Publication Data
US 2023/0278302 A1    Sep. 7, 2023

(30) Foreign Application Priority Data
Mar. 2, 2022    (KR) .................... 10-2022-0026885

(51) Int. Cl.
*B29D 30/06*    (2006.01)
(52) U.S. Cl.
CPC .. *B29D 30/0681* (2013.01); *B29D 2030/0682* (2013.01)
(58) Field of Classification Search
CPC ....... B60C 19/00; B60C 19/002; B60C 19/12; B60C 19/125; B29D 30/0681; B29D 30/0682; B29D 30/0685; B29D 30/26; B29D 2030/0686; B29D 2030/069; B29D 2030/0691
USPC .................................................... 156/421.6
See application file for complete search history.

(56) References Cited

U.S. PATENT DOCUMENTS

| 2006/0102272 A1* | 5/2006 | Iyanagi | B29D 30/36 156/402 |
| 2011/0120625 A1* | 5/2011 | Mancini | B29D 30/32 156/394.1 |

FOREIGN PATENT DOCUMENTS

| CN | 106808625 A | * | 6/2017 |
| CN | 213106170 U | * | 5/2021 |
| CN | 114670477 A | * | 6/2022 |
| EP | 2962875 A1 | | 1/2016 |

(Continued)

OTHER PUBLICATIONS

Li Y, CN-213106170-U, machine translation. (Year: 2021).*

(Continued)

*Primary Examiner* — Sedef E Paquette
(74) *Attorney, Agent, or Firm* — MEDLER FERRO WOODHOUSE & MILLS PLLC (57) ABSTRACT

The present invention provides a tire sound absorbing material crimping device, and more particularly, a tire sound absorbing material crimping device intended to uniformly and firmly press a sound absorbing material adhered to an inner liner portion of a tire. The tire sound absorbing material crimping device according to an embodiment of the present invention includes a fixing unit configured to align a center of a tire transported by a tire conveying unit and position the tire; a crimping unit configured to press a sound absorbing material while expanding radially toward the sound absorbing material adhered to an inner liner of the tire fixed to the fixing unit; and a motor unit connected to an upper portion of the crimping unit and configured to raise and lower the crimping unit toward the tire.

5 Claims, 6 Drawing Sheets

(56) References Cited

FOREIGN PATENT DOCUMENTS

| | | |
|---|---|---|
| EP | 3466661 A1 | 4/2019 |
| EP | 3888896 A1 | 10/2021 |
| JP | 2020097333 A * | 6/2020 |
| KR | 10-0511602 B1 | 8/2005 |
| KR | 10-1775797 B1 | 9/2017 |
| KR | 10-2022959 B1 | 9/2019 |

OTHER PUBLICATIONS

Tsuji N, JP-2020097333-A, machine translation. (Year: 2020).*
Xiao L, CN-114670477-A, machine translation. (Year: 2022).*
Sun X, CN-106808625-A, machine translation. (Year: 2017).*

* cited by examiner

FIG. 6

TIRE SOUND ABSORBING MATERIAL CRIMPING DEVICE

CROSS REFERENCE TO RELATED APPLICATIONS

This application claims the priority benefit of Korean Patent Application No. 10-2022-0026885 filed on Mar. 2, 2022, the entirety of which is incorporated by reference herein.

BACKGROUND OF THE INVENTION

1. Field of the Invention

The present invention relates to a tire sound absorbing material crimping device, and more particularly, to a tire sound absorbing material crimping device intended to uniformly and firmly press a sound absorbing material adhered to an inner liner portion of a tire.

2. Description of the Related Art

Unless otherwise indicated herein, the contents described in this section are not prior art to the claims of the present application, and inclusion in this section is not admitted to be the prior art.

Generally, in the manufacture of a tire, a raw material undergoes refining, rolling, extrusion, and bead processes, and is prepared into a green tire through a molding process, and then is manufactured into a finished tire through a vulcanization process. Compressed air is injected into the finished tire, such that noise is generated inside the tire during driving, which is called resonance. This noise causes a deterioration in riding comfort for the driver who drives a vehicle and passengers inside the vehicle. In order to reduce this resonance of the tire, a sound absorbing material is adhered to an inner surface of the tire, more precisely, to an inner liner portion located on a side opposite to the tire tread in a circumferential direction. As a method of adhering a sound absorbing material, first, an adhesive is applied to a portion where the sound absorbing material is to be adhered on the tire inner liner, and the sound absorbing material is attached thereto. Then, the sound absorbing material is firmly fixed to the adhesive by pressing the sound absorbing material through a separate sound absorbing material adhesion device.

In this regard, Korean Patent Registration No. 10-1775797 discloses "a tire sound absorbing material fixing structure having a sound absorbing material fixing band and a tire manufactured including the same." More specifically, a fixing method of the tire sound absorbing material disclosed in this patent includes the steps of: extending a sound absorbing material fixing band upward by applying a force to a pressing part; positioning a sound absorbing material on a lower portion of the pressing part; applying a pressure downward to the sound absorbing material while the sound absorbing material fixing band contracts by removing the applied force that extends the sound absorbing material fixing band; maintaining a close contact state between the sound absorbing material and an inner surface of the tire by the sound absorbing material fixing band; positioning the sound absorbing material on the lower portion of the pressing part of the adjacent sound absorbing material fixing band by extending upward the adjacent sound absorbing material fixing band. When using the fixing structure obtained by the above method, the above steps are repeatedly performed until the sound absorbing material is fixedly adhered to the entire sound absorbing material fixing band formed in the circumferential direction of the tire.

However, when using the fixing structure of the tire sound absorbing material obtained by the above method, in the process of repeatedly performing the steps of pressing the pressing part, positioning it on the sound absorbing material, applying pressure downward toward the sound absorbing material, and adhering to the sound absorbing material, a worker should perform the work manually without an additional auxiliary machine or device for fixing the sound absorbing material fixing band. Accordingly, the process itself takes a lot of time and requires considerable effort and labor, and as the process is repeatedly performed, a deviation may occur in the adhesion location or strength, thereby resulting in a problem in that quality of the finished tire may be deteriorated.

PRIOR ART DOCUMENT

Patent Document (Patent Document 1) Korean Patent Registration No. 10-1775797 (published on Sep. 6, 2017)

SUMMARY OF THE INVENTION

It is an object of the present invention to provide a tire sound absorbing material crimping device intended to uniformly and firmly press the sound absorbing material adhered to an inner liner portion of a tire.

In addition, it is not limited to the technical problems as described above, and it is obvious that another technical problem may be derived from the following description.

To achieve the above objects, according to an aspect of the present invention, there is provided a tire sound absorbing material crimping device including: a fixing unit configured to align a center of a tire transported by a tire conveying unit and position the tire; a crimping unit configured to press a sound absorbing material while expanding radially toward the sound absorbing material adhered to an inner liner of the tire fixed to the fixing unit; and a motor unit connected to an upper portion of the crimping unit and configured to raise and lower the crimping unit toward the tire.

According to a preferred feature of the present invention, the crimping unit may include: a first plate having a predetermined thickness and area; a plurality of main frames formed on a lower portion of the first plate and extending or contracting radially based on a central axis of the first plate; and a crimping ring which connects lower portions of the plurality of main frames with each other and is configured to press the sound absorbing material of the tire by expanding or contracting a diameter thereof according to an operation of radially expanding or contracting the main frames.

According to a preferred feature of the present invention, the crimping unit further may include a servomotor installed on the first plate, and the servomotor may include a first gear formed on a lower portion thereof, and each of the main frames may include a second gear formed on an upper one side thereof to be meshed with the first gear, such that when operating the servomotor, the main frames are radially expanded and contracted while the meshed first and second gears are rotated.

According to a preferred feature of the present invention, the motor unit may be arranged above the second plate disposed above the first plate, and may include a motor axis having a drive gear formed thereon, wherein a plurality of shafts are arranged above the second plate, which respectively has one end fixed to the first plate and the other end extending upward from the first plate by penetrating the second plate and having a driven gear formed on an outer circumferential surface to be meshed with the drive gear, and when operating the motor unit, the plurality of shafts connected to the first plate are lowered in a longitudinal direction thereof by the driven gear rotated by the drive gear, such that the crimping unit is moved to the tire.

According to a preferred feature of the present invention, the crimping ring may include a plurality of segments connected to lower portions of the plurality of main frames, respectively, and having a predetermined curvature, wherein the plurality of segments include: first segments located outside in a radial direction and having guide pins formed at both ends thereof; and second segments located inside in the radial direction and having guide grooves extending in a circumferential direction, into which the guide pins of the first segment are inserted, wherein the second segments are configured to expand and contract an entire diameter of the crimping ring while the guide pins are guided along the guide grooves.

According to a preferred feature of the present invention, the main frame may include: an upper frame into which a screw part of a ball screw expanding radially from the second gear is inserted; a center frame extending downward from the upper frame; and a lower frame expanding radially from a lower end of the center frame.

According to the present invention, by using a mechanical device capable of accurately and firmly pressing the sound absorbing material adhered to the inner liner of the tire, it is possible to solve the problem that the sound absorbing material is not uniformly adhered due to a tread curvature and to produce a product with constant quality.

In addition, according to the present invention, by pressing and fixing the sound absorbing material without a separate configuration adhered to the sound absorbing material, it is possible to block additional noise generating factors.

Further, according to the present invention, the crimping condition can be changed for each tire size, such that the tire sound absorbing material crimping device may be used universally for all tires of various sizes.

The effects of the present invention are not limited to the above advantages, and those skilled in the art should understand that it includes all effects that can be deduced from the detailed description of the present invention or the configurations of the invention described in the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, configurations, operations, and effects of an apparatus for disinfecting a robot according to preferred embodiments will be described with reference to the accompanying drawings. For reference, in the drawings described below, each component is omitted or schematically illustrated for convenience and clarity, and the size of each component does not reflect an actual size. In addition, the same reference numerals are denoted to the same components throughout the specification, and reference numerals for the same components in individual drawings will be omitted.

Figure 1:
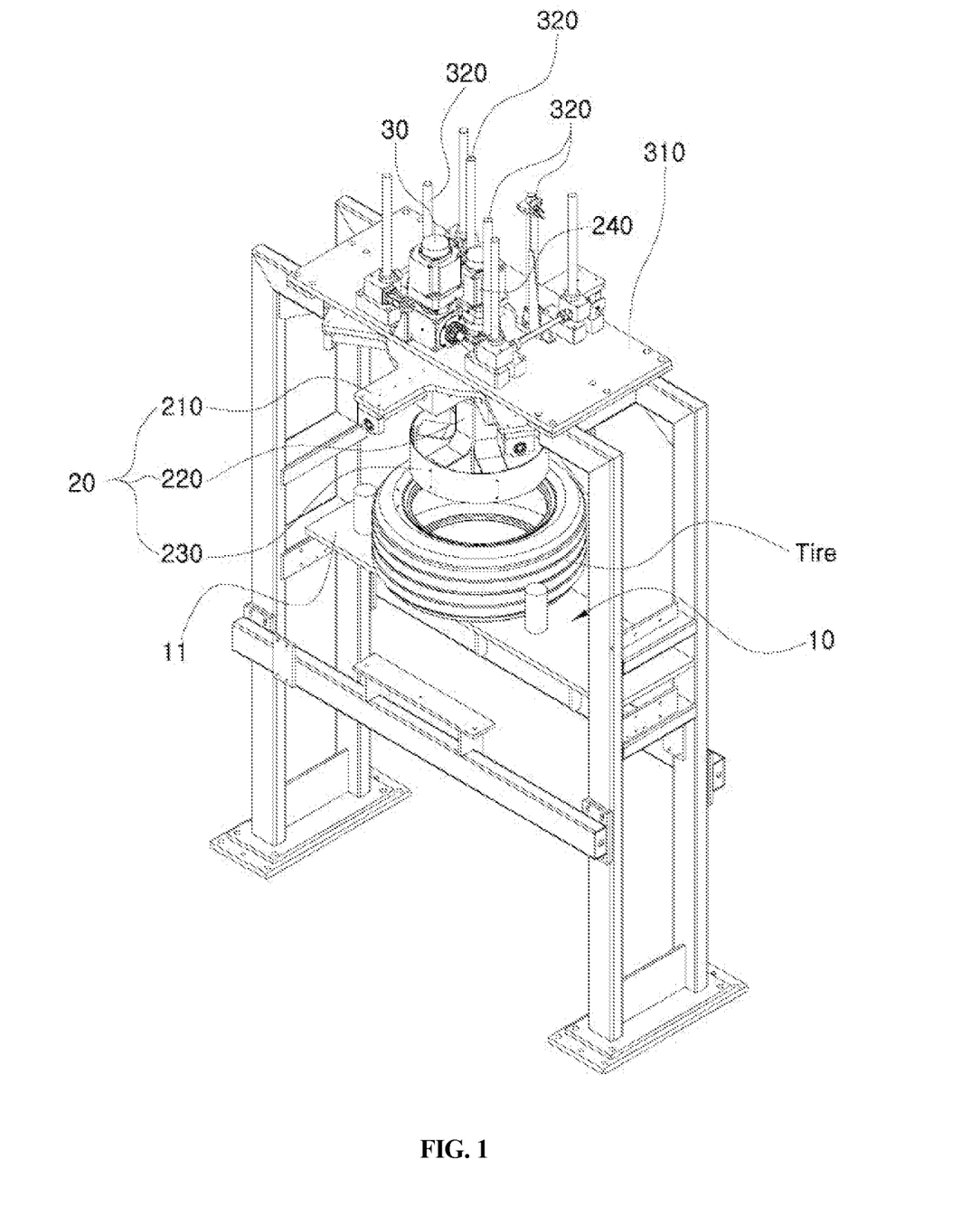
FIG. 1 is a perspective view illustrating a tire sound absorbing material crimping device according to an embodiment of the present invention.
Figure 2:
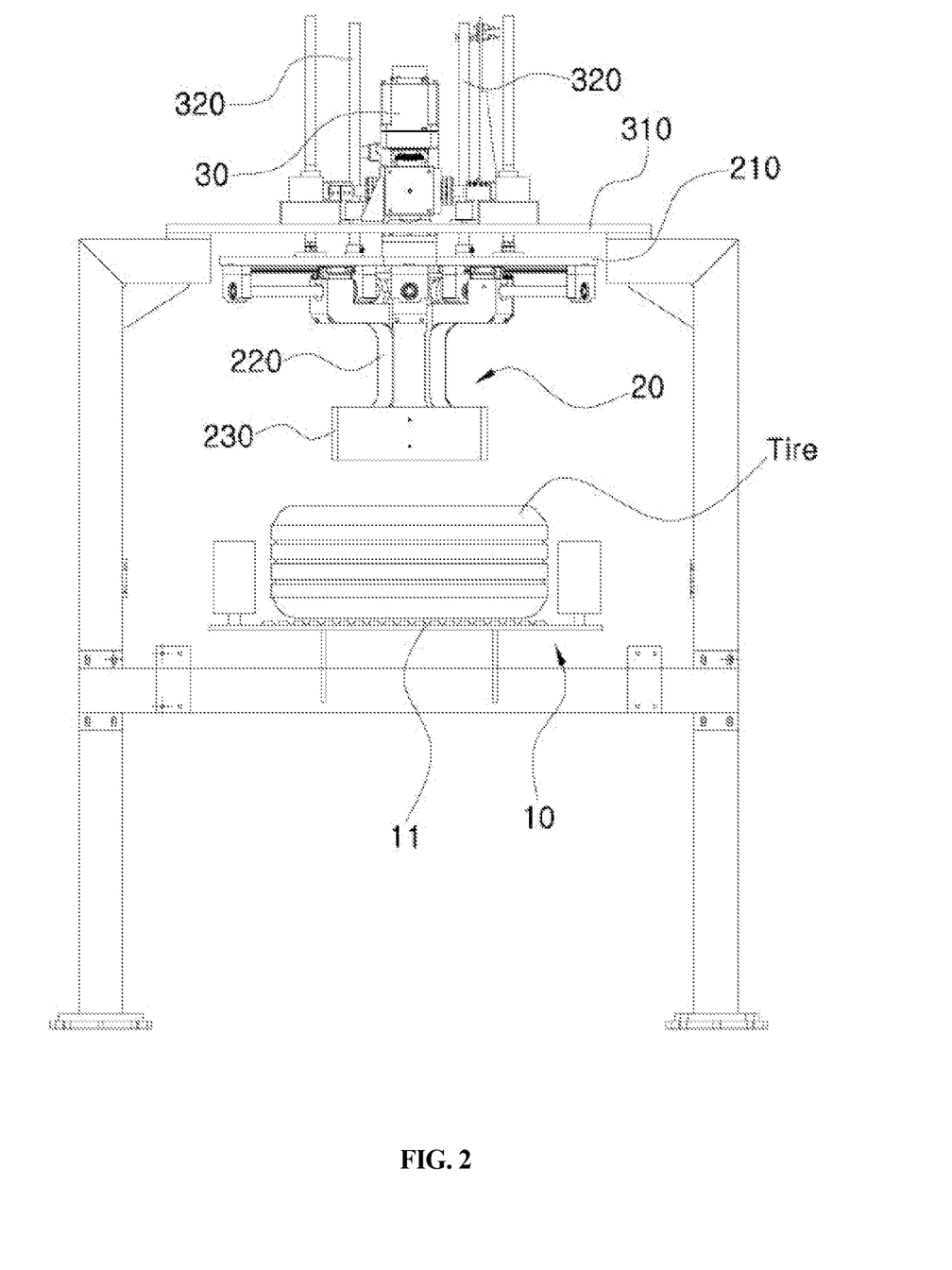
FIG. 2 is a front view illustrating the tire sound absorbing material crimping device according to an embodiment of the present invention.

A tire sound absorbing material crimping device according to an embodiment of the present invention includes: a fixing unit 10 configured to align a center of a tire transported by a tire conveying unit 11 and position the tire; a crimping unit 20 configured to press a sound absorbing material while expanding radially toward the sound absorbing material adhered to an inner liner of the tire fixed to the fixing unit 10; and a motor unit 30 connected to an upper portion of the crimping unit 20 and configured to raise and lower the crimping unit 20 toward the tire.

The tire conveying unit 11 is configured to transfer the tire by a transfer device such as a conveyor belt in a state where a sound absorbing material is adhered to the tire, preferably to an inner liner of the tire. The tire transported by the tire conveying unit 11 is stopped with being positioned below the tire sound absorbing material crimping device. Thereafter, the fixing unit 10 fixes an outer periphery of the tire to align the center while preventing the tire from being separated. The fixing unit 10 according to an embodiment includes a plurality of fixing rods which are located above the tire conveying unit 11, extend upward in a width direction of the outer circumferential surface of the tire, and are configured to move toward a central axis of the transferred tire, and align the center of the tire while supporting the outer circumferential surface thereof.

Next, the crimping unit 20 presses the sound absorption material while expanding radially toward the sound absorption material adhered to the inner liner of the tire fixed to the fixing unit 10.

Figure 3:
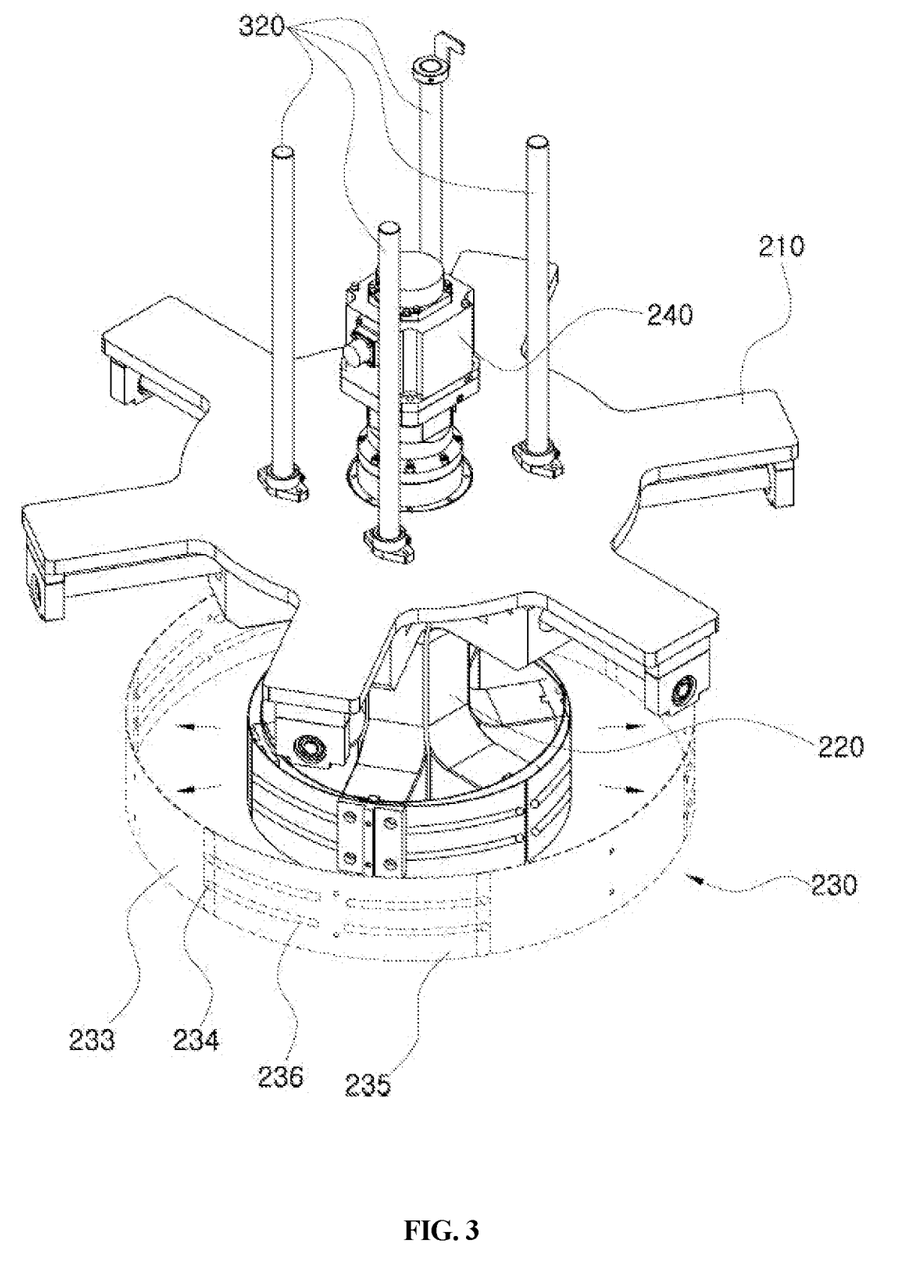
FIG. 3 is a detailed view of a crimping unit illustrating a state where a crimping ring is contracted and expanded in the tire sound absorbing material crimping device according to an embodiment of the present invention.
Figure 4:
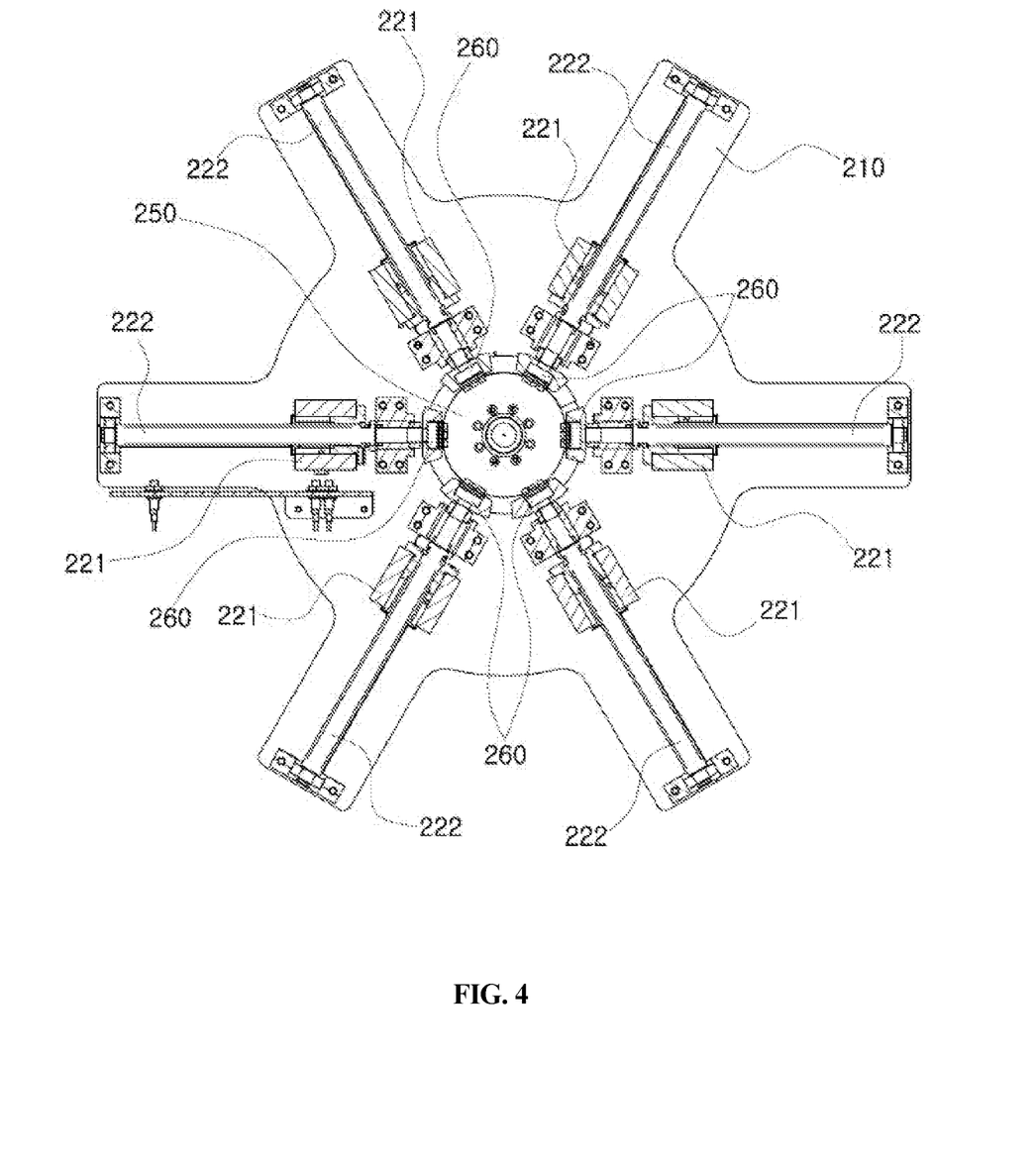
FIG. 4 is an upper cross-sectional view of the crimping unit in the tire sound absorbing material crimping device according to an embodiment of the present invention.

According to a preferred feature of the present invention, the crimping unit 20 may include a first plate 210 having a predetermined thickness and area; a plurality of main frames 220 formed on a lower portion of the first plate 210 and expanding or contracting radially based on a central axis of the first plate 210; and a crimping ring 230 which connects lower portions of the plurality of main frames 220 with each other and is configured to press the sound absorbing material of the tire by expanding or contracting a diameter thereof according to an operation of radially expanding or contracting the main frames 220.

The sound absorbing material adhered to the inner liner of the tire is pressed by the crimping unit 20, and the detailed configuration of the crimping unit 20 will be described below.

First, the first plate 210 having a predetermined thickness and area may be installed on the top, preferably formed in a disk shape, and have a diameter corresponding to a length that the main frame 220 to be described below expands to the maximum in the radial direction.

The main frame 220 is formed on the lower portion of the first plate 210 and may radially expand or contract based on the central axis of the first plate 210. The main frame 220 may be composed of a plurality of frames which are radially expanded or contracted based on a central axis of the first plate 210 and a central axis of the tire defined by fixing the position of the tire and aligning the center by the fixing unit 10. Preferably, the plurality of main frames are arranged side by side in a circumferential circumference based on the central axis of the first plate 210, and can be expanded or contracted radially during operation.

Figure 5:
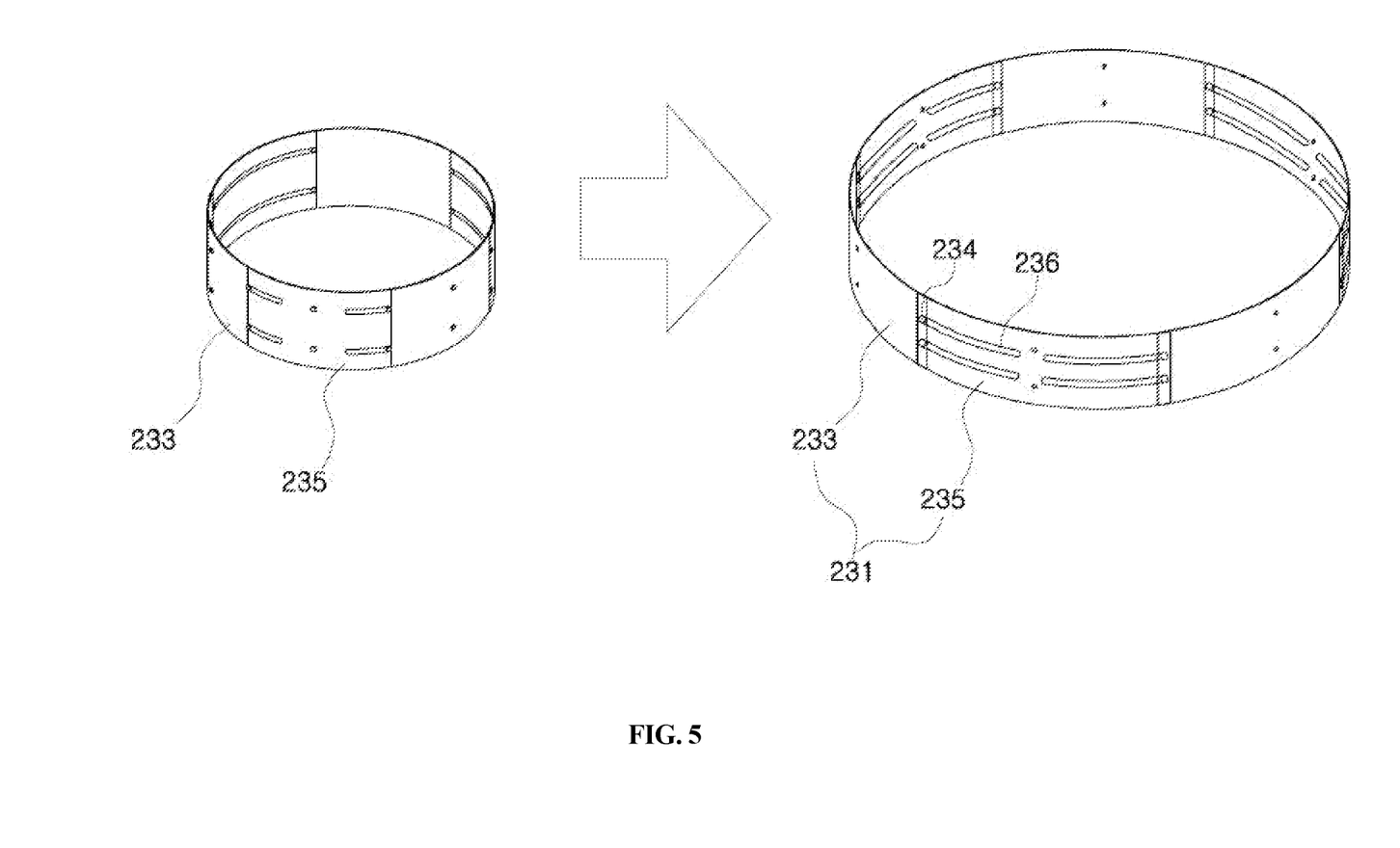
FIG. 5 is a perspective view illustrating a state where the contracted crimping ring is expanded in the tire sound absorbing material crimping device according to an embodiment of the present invention.

In addition, the crimping ring 230 may press the sound absorbing material of the tire by expanding or contracting the diameter thereof according to the operation of radially expanding or contracting the main frames 220. When the main frame 220 is radially expanded or contracted during operation, the diameter of the crimping ring 230 formed in a ring shape by connecting the lower portions of the plurality of main frames 220 is also expanded or reduced. Herein, as the diameter of the crimping ring 230 is expanded, the sound absorbing material adhered to the inner liner portion of the tire may be firmly pressed. Preferably, a length of the crimping ring 230 in a width direction and a length of the sound absorbing material in the width direction are formed to correspond to each other, such that all regions of the sound absorbing material can be uniformly pressed.

According to a preferred feature of the present invention, the crimping ring 230 is connected to each of the lower portions of the plurality of main frames 220, and includes a plurality of segments 231 having a predetermined curvature. The plurality of segments 231 may include: first segments 233 located outside in a radial direction and having guide pins 234 formed at both ends thereof, and second segments 235 located inside in the radial direction and having guide grooves 236 extending in the circumferential direction, into which the guide pins 234 of the first segment 233 are inserted, wherein the second segments 235 are configured to expand and contract an entire diameter of the crimping ring 230 while the guide pins 234 are guided along the guide grooves 236.

The crimping ring 230, more precisely, the crimping ring 230 connected to the lower portions of the plurality of main frames 220 and formed in a ring shape as a whole may include the plurality of segments 231 having a predetermined curvature. Herein, the plurality of segments 231 have the same curvature and are interconnected to form one circle, and the first segment 233 located outside in the radial direction and the second segment 235 located inside in the radial direction are alternately arranged, and some regions at both ends of these segments are overlapped with each other. The guide pins 234 are formed at both ends of each of the first segments 233, and guide grooves 236 are formed in each of the second segment 235, into which the guide pins 234 can be inserted and guided in the circumferential direction. Accordingly, when the main frames 220 are expanded, the entire first segments 233 and the second segments 235 are radially expanded as the guide pins 234 move along the guide grooves 236. As the plurality of segments 231 are expanded toward the sound absorbing material to press the sound absorbing material, uniform crimping may be achieved over an entire area of the sound absorbing material through the above process.

According to a preferred feature of the present invention, the crimping unit 20 further includes a servomotor 240 installed on the first plate 210. The servomotor 240 includes a first gear 250 formed on a lower portion thereof, and each of the main frames 220 includes a second gear 260 formed on an upper one side thereof to be meshed with the first gear 250. Therefore, when operating the servomotor 240, the main frames 220 can be radially expanded and contracted while the meshed first and second gears are rotated.

An embodiment for radially expanding and contracting the main frame 220 will be described below. First, when the first gear 250 of the servomotor 240 installed on the first plate 210 is rotated in one direction about an axis thereof, the main frames 220 are radially expanded by the second gear 260 meshed with the first gear 250, whereas when rotated in the opposite direction, they are radially contracted. When operating the servomotor 240, the first gear 250 formed on the lower portion of the servomotor 240 and the second gear 260 formed on the upper one side of each of the main frames 220 are rotated with being meshed, thus to move the main frames 220 radially. More specifically, the first gear 250 is a gear rotating about the axis of the servomotor 240, and the second gear 260 is a gear connected to each of the main frames 220 and rotated by the first gear 250 with being meshed. These gear are formed in a bevel gear (or spiral bevel gear) type in which the first gear 250 is formed as a ring gear, and the second gear 260 is formed as a pinion gear. That is, due to these gears of which axes are arranged at a predetermined angle, rotation of the shaft of the servomotor 240 is transmitted to the second gear 260 through the first gear 250, such that the main frames 220 can be radially expanded or contracted. Accordingly, when rotating the shaft of the servomotor 240, the second gears 260 of the main frames 220 are rotated due to the rotation of the first gear 250, and the main frames 220 may be radially expanded or contracted.

According to a preferred feature of the present invention, the main frame 220 may include: an upper frame 221 into which a screw part 222 of a ball screw expanding radially from the second gear 260 is inserted; a center frame 223 extending downward from the upper frame 221; and a lower frame 225 extending radially from a lower end of the center frame 223.

Herein, the ball screw is a motion conversion device that converts rotational motion into linear motion. The ball screw may have a structure in which one end of the second gear 260 is meshed with the first gear 250 and the other end of the screw part 222 extends radially from the second gear 260, wherein the upper frame 221 having an insertion hole into which the screw part 222 is inserted functions as a nut part of the ball screw. Therefore, when the second gear 260 rotates, the upper frame 221 moves linearly through the nut part while the screw part 222 is rotated, such that the main frame 220 moves linearly in a longitudinal direction of the screw, that is, in the radial direction. According to the structure of the ball screw, the linear motion of the screw part 222 is transferred from the upper frame 221 to the center frame 223 extending vertically downward, and then to the lower frame 225 expanding radially and horizontally from the center frame 223, such that the above-described plurality of segments 231 installed outside the lower frames 225 can be radially expanded or contracted.

Next, the motor unit 30 connected to the upper portion of the crimping unit 20 and configured to raise and lower the crimping unit 20 toward the tire will be described.

Herein, the motor unit 30 includes a plurality of shafts 320 arranged above the second plate 310, which respectively has one end fixed to the first plate 210 and the other end extending upward from the first plate 210 by penetrating the second plate 310. The motor unit 30 and the shafts 320 are operatively connected with each other through a gear mechanism to be described below, such that when operating the motor unit 30, the plurality of shafts 320 connected to the first plate 210 are lowered in the longitudinal direction thereof by an operation of the gear mechanism, and the crimping unit 20 is moved to the tire.

Figure 6:
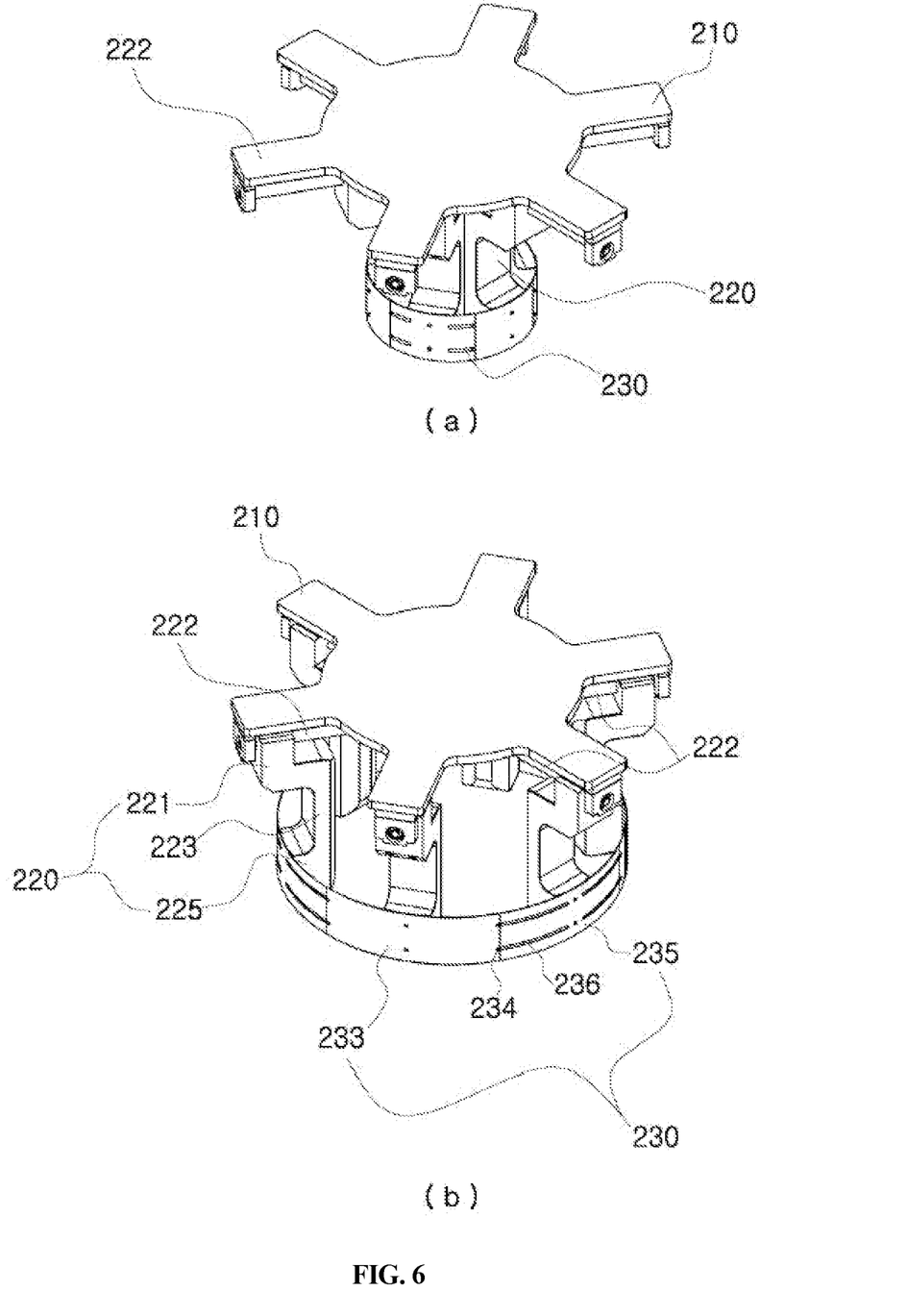
FIG. 6 is a perspective view illustrating an operating state of the crimping unit in the tire sound absorbing material crimping device according to an embodiment of the present invention.

A process of lowering the crimping unit 20 toward the transferred tire before the process of radially expanding or contracting the crimping unit 20 inside the tire and a process of raising the crimping unit 20 again after the crimping is completed will be described below.

First, the motor unit 30 configured to raise and lower the crimping unit 20 may include a motor axis having a drive gear formed thereon, and may be arranged above the second plate 310 having a predetermined thickness and area disposed above the first plate 210. In particular, the plurality of shafts 320 having one end fixed to the first plate 210 and the other end extending upward by penetrating the second plate 310 may have a driven gear formed on an outer circumferential surface to be meshed with the drive gear. When operating the motor unit 30, the drive gear rotates by the motor axis arranged in parallel in the horizontal direction, and the driven gear of the shaft 320 meshed with the drive gear is rotated to move the shaft 320 up and down. Accordingly, the crimping unit 20 is raised or lowered toward the tire. The plurality of shafts 320 may be installed at a predetermined distance about the motor unit 30, and preferably has a structure for raising and lowering the crimping unit 20 while maintaining balance as a whole.

Although preferred embodiments of the present invention have been described with reference to the accompanying drawings, the embodiments and drawings described and illustrated in the present disclosure are simply the most preferred embodiment and do not represent all the technical sprites of the present invention, and it will be understood that various modifications and equivalents may be made to take the place of the embodiments at the time of filling the present application. Thus, it is clear that the above-described embodiments are illustrative in all aspects and do not limit the present disclosure. The scope of the present disclosure is defined by the following claims rather than by the detailed description of the embodiment. It shall be understood that all modifications and embodiments conceived from the meaning and scope of the claims and their equivalents are included in the scope of the present disclosure.

DESCRIPTION OF REFERENCE NUMERALS

10: Fixing unit
11: Tire conveying unit
20: Crimping unit
210: First plate
220: Main frame
221: Upper frame
222: Screw
223: Center frame
225: Lower frame
230: Crimping ring
231: Segment
233: First segment
234: Guide pin
235: Second segment
236: Guide groove
240: Servomotor
250: First gear
260: Second gear
30: Motor unit
310: Second plate
320: Shaft

What is claimed is:

1. A tire sound absorbing material crimping device comprising:
a fixing unit configured to align a center of a tire transported by a tire conveying unit and position the tire;
a crimping unit configured to press a sound absorbing material while expanding radially toward the sound absorbing material adhered to an inner liner of the tire fixed to the fixing unit; and
a motor unit connected to an upper portion of the crimping unit and configured to raise and lower the crimping unit toward the tire,
wherein the crimping unit comprises:
a first plate having a predetermined thickness and area;
a plurality of main frames formed on a lower portion of the first plate and extending or contracting radially based on a central axis of the first plate; and
a crimping ring which connects lower portions of the plurality of main frames with each other and is configured to press the sound absorbing material to the tire by expanding or contracting a diameter thereof according to an operation of radially expanding or contracting the plurality of main frames.

2. The tire sound absorbing material crimping device according to claim 1, wherein the crimping unit further comprises a servomotor installed on the first plate, and
the servomotor comprises a first gear formed on a lower portion thereof, and each of the plurality of main frames comprises a second gear formed on an upper one side thereof to be meshed with the first gear, such that when operating the servomotor, the plurality of main frames are radially expanded or contracted while the meshed first and second gears are rotated.

3. The tire sound absorbing material crimping device according to claim 2, wherein each of the plurality of main frames comprises:
an upper frame into which a screw part of a ball screw expanding radially from the second gear is inserted;
a center frame extending downward from the upper frame; and
a lower frame expanding radially from a lower end of the center frame.

4. The tire sound absorbing material crimping device according to claim 1, wherein the motor unit:
is arranged above a second plate, wherein the second plate is disposed above the first plate; and
comprises a motor axis comprising a drive gear and is operatively connected to a plurality of shafts extending upward from the first plate, wherein the plurality of shafts comprise a driven gear configured to mesh with the drive gear, and
wherein, when operating the motor unit, the plurality of shafts connected to the first plate are lowered in a longitudinal direction thereof by an operation of the drive gear and the driven gear, such that the crimping unit is moved to the tire.

5. The tire sound absorbing material crimping device according to claim 1, wherein the crimping ring comprises a plurality of segments connected to lower portions of the plurality of main frames, respectively, and having a predetermined curvature, wherein the plurality of segments comprises:

first segments located outside in a radial direction and having guide pins formed at both ends thereof; and second segments located inside in the radial direction and having guide grooves extending in a circumferential direction, into which the guide pins of the first segment are inserted, wherein the second segments are configured to expand or contract an entire diameter of the crimping ring while the guide pins are guided along the guide grooves.

* * * * *